US005571270A

United States Patent [19]
Larkin

[11] Patent Number: 5,571,270
[45] Date of Patent: Nov. 5, 1996

[54] HITCH ASSEMBLY WITH RETRACTABLE TRAILER COUPLING

[76] Inventor: Kenneth M. Larkin, 342 SE. Evergreen, Redmond, Oreg. 97756

[21] Appl. No.: 441,445

[22] Filed: May 15, 1995

[51] Int. Cl.$^6$ ............................................. B60D 1/54
[52] U.S. Cl. ........................ 280/491.1; 280/417.1; 280/457; 280/901
[58] Field of Search .................. 280/491.1, 491.3, 280/504, 511, 901, 415.1, 417.1, 457

[56] References Cited

U.S. PATENT DOCUMENTS

| | | | |
|---|---|---|---|
| 3,125,355 | 3/1964 | Snuggins | 280/457 |
| 3,132,878 | 5/1964 | De Puydt et al. | 280/457 |
| 3,827,722 | 8/1974 | Miller et al. | 280/432 |
| 3,869,148 | 3/1975 | Iehl | 280/457 |
| 3,870,343 | 3/1975 | McGahee | 280/457 |
| 3,889,978 | 6/1975 | Kann | 280/417.1 |
| 4,256,324 | 3/1981 | Hamilton | 280/415.1 X |
| 4,540,194 | 9/1985 | Dane | 280/901 X |
| 5,145,199 | 9/1992 | Howard | 280/901 X |
| 5,435,585 | 7/1995 | Chambers | 280/901 X |

*Primary Examiner*—Kevin Hurley
*Attorney, Agent, or Firm*—Kolisch Hartwell Dickinson McCormack & Heuser

[57] ABSTRACT

A hitch assembly is proved with a retractable hitch mount and a retractable safety chain connector, both of which retract to provide a hitch assembly which conforms substantially to the contour of the towing vehicle body when the hitch assembly is not in use. The hitch mount is configured for retractable extension from a hitch base plate, providing a seat for a matching trailer mount. The safety chain connector is configured for retractable extension from the base plate, providing a seat for a trailer-connected safety chain. The hitch base plate attaches to the towing vehicle body, defining a support surface which is contoured substantially similar to the body contour of the towing vehicle. When the hitch mount and safety chain connector are retracted, the hitch assembly conforms generally to the body contour of the towing vehicle, minimizing any interference with the vehicle's use.

5 Claims, 3 Drawing Sheets

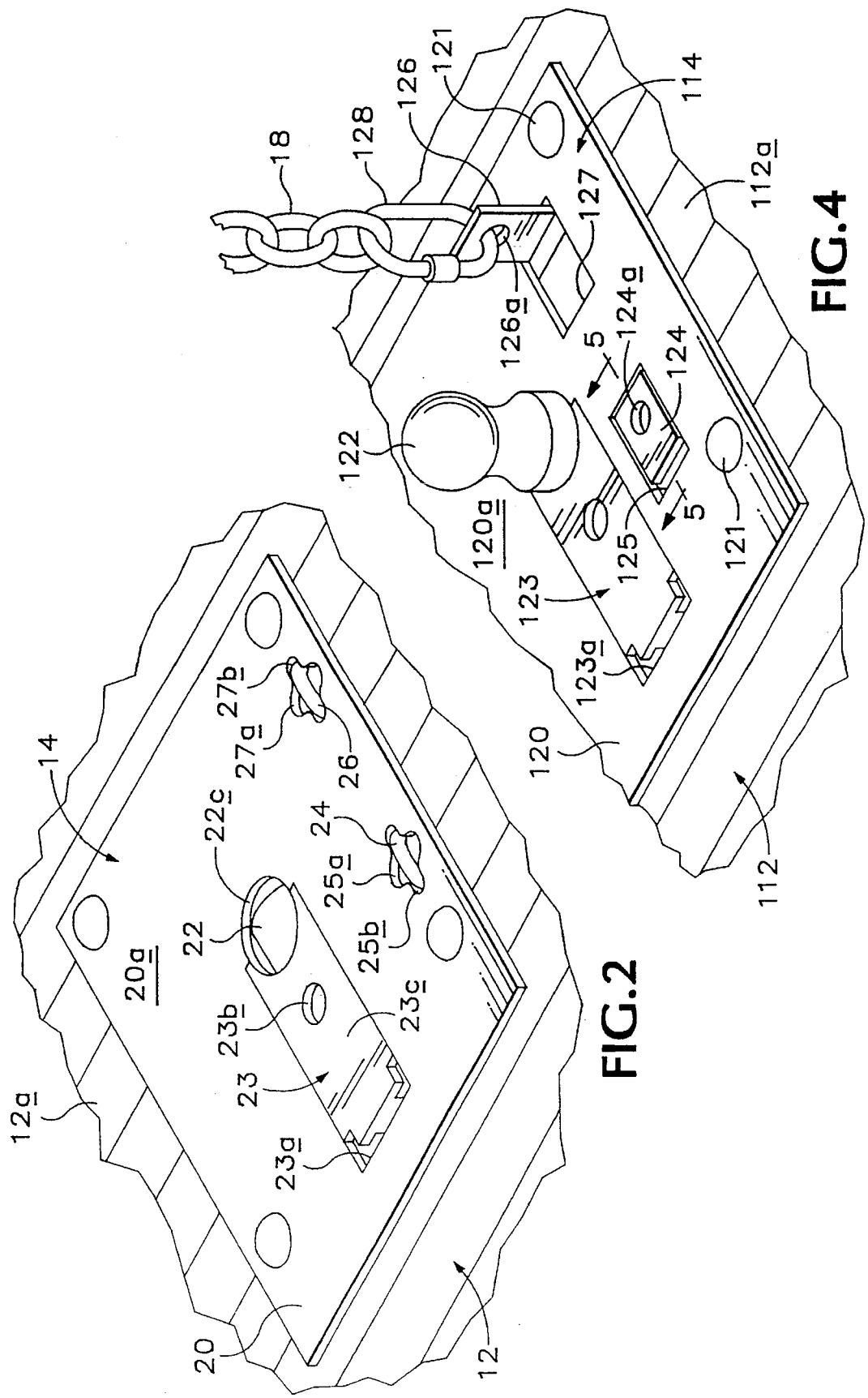

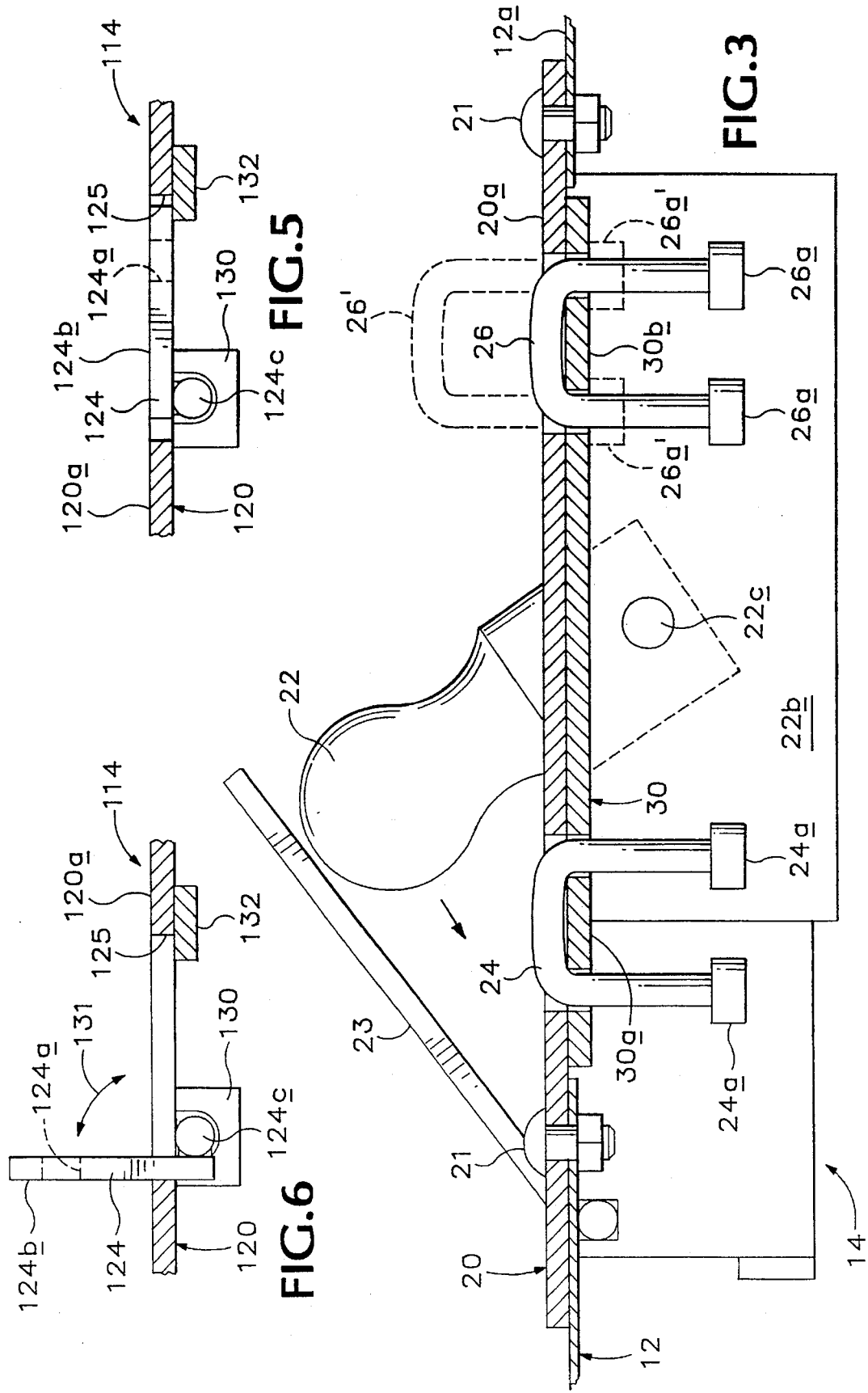

HITCH ASSEMBLY WITH RETRACTABLE TRAILER COUPLING

TECHNICAL FIELD

The present invention relates generally to hitches, and more particularly, to a hitch assembly which employs a hitch mount and a safety chain connector, both of which may be retracted so as to establish a hitch assembly which conforms substantially to the contour of the surface on which the assembly mounts. This arrangement has proven especially useful in the context of a fifth wheel hitch assembly of the type which may be found in the bed of a pick-up truck or flat bed truck, and the invention is described in that context below.

BACKGROUND ART

For a number of years now, various states have required the use of chains, or cables, as a measure of safety when coupling a towing vehicle with a trailer which is to be towed. In a typical hitch assembly, such chains extend from the trailer to the towing vehicle, providing a secondary coupling for use in the event of a failure of the primary coupling, i.e. a failure of the hitch mount. These so-called safety chains have proven particularly important where the coupling is temporary, such as that which is provided by a typical ball and socket hitch. These hitches, it will be understood, are specially designed to provide for selected decoupling of the towed and towing vehicles, and thus may suffer from unintentional decoupling of such vehicles while in use.

Ball and socket hitch assemblies have been characterized by a variety of configurations, serving variously to carry everything from small utility trailers (e.g., by a rear bumper hitch configuration) to large boats and campers (e.g., by a fifth wheel hitch configuration). Safety chains have found utility in many of these configurations, including fifth wheel hitch configurations where the load carried by the hitch is substantial, and the consequences of hitch failure are correspondingly severe. Such fifth wheel hitches commonly mount to the towing vehicle's body, most often being secured to the bed of a flat bed truck. Other fifth wheel hitches mount to the roof of the towing vehicle, or to another vehicle body surface which will provide adequate structural support.

Because most hitches are used intermittently, manufacturers long have sought to provide a hitch assembly which detachably mounts to the vehicle, or which may easily and quickly be adjusted so to provide only minimal interference with the vehicle's use. One such hitch (manufactured by Atwood Mobile Products of Rockford, Ill.) has been provided with a retractable hitch ball, the hitch assembly being mounted above an opening in the vehicle body, and the hitch ball being retractable into such opening so as to diminish interference of the hitch with normal vehicle appearance and use. The Atwood hitch assembly, however, has not adequately addressed the need for safety chains, having failed to provide a connector to which a safety chain may be secured. It thus would be desirable to provide a hitch assembly including a safety chain connector which is retractable so as to minimize interference with the vehicle's use.

DISCLOSURE OF THE INVENTION

The aforementioned object is addressed by provision of a hitch assembly with a retractable hitch mount and a retractable safety chain connector, both of which retract to provide a hitch assembly which conforms substantially to the contour of the towing vehicle body when the hitch assembly is not in use. The hitch mount is configured for retractable extension from a hitch base plate, providing a seat for a matching trailer mount. The safety chain connector also is configured for retractable extension from the base plate to provide a seat for a trailer connected safety chain. The hitch base plate is configured for attachment to the towing vehicle body, defining a support surface which is contoured substantially similar to the body contour of the towing vehicle (typically the bed of a pick-up truck or flat bed truck). When the hitch mount and safety chain connector are retracted, the hitch assembly conforms generally to the body contour of the towing vehicle, minimizing any interference with the vehicle's use.

Typically, the base plate defines a hitch mount recess configured to house the hitch mount, and a pair of safety chain recesses configured to house a pair of safety chain connectors, often in the form of a loop segment, or flap. Each safety chain connector thus typically defines an eyelet, such eyelet providing a seat for the trailer-connected chain. When the hitch assembly is not in use, the hitch mount is retracted into the hitch mount recess, and the safety chain connectors are retracted into the safety chain recesses, providing a hitch assembly lies generally flush with the vehicle body contour (e.g., a generally planar truck bed). The towing vehicle thus is configured to safely tow a trailer using the invented hitch assembly, but may readily be adapted for conventional use when the hitch assembly is not in use.

These and other objects and advantages of the present invention will be more readily understood after a consideration of the drawings and the detailed description which follows.

BRIEF DESCRIPTION OF THE DRAWINGS

FIG. 2 is an isometric view of the hitch assembly shown in FIG. 1, the hitch assembly's hitch mount and safety chain connectors having been retracted such that the hitch assembly lies generally flush with the truck bed.

FIG. 3 is a side sectional view of the hitch assembly of FIG. 1, the hitch assembly being sectioned along lines 3—3 to illustrate retraction and extension of the hitch mount and safety chain connectors.

FIG. 4 is a partial isometric view of an alternative embodiment hitch assembly, such assembly being mounted in the bed of a truck in a configuration whereby a trailer may be coupled therewith.

FIG. 5 is a fragmentary side sectional view taken generally along lines 5—5 of the hitch assembly in FIG. 4 to show a safety chain connector thereof in a retracted orientation.

FIG. 6 is a fragmentary sectional view similar to that of FIG. 5, but with the safety chain connector extended for coupling with a safety chain.

Figure 1:
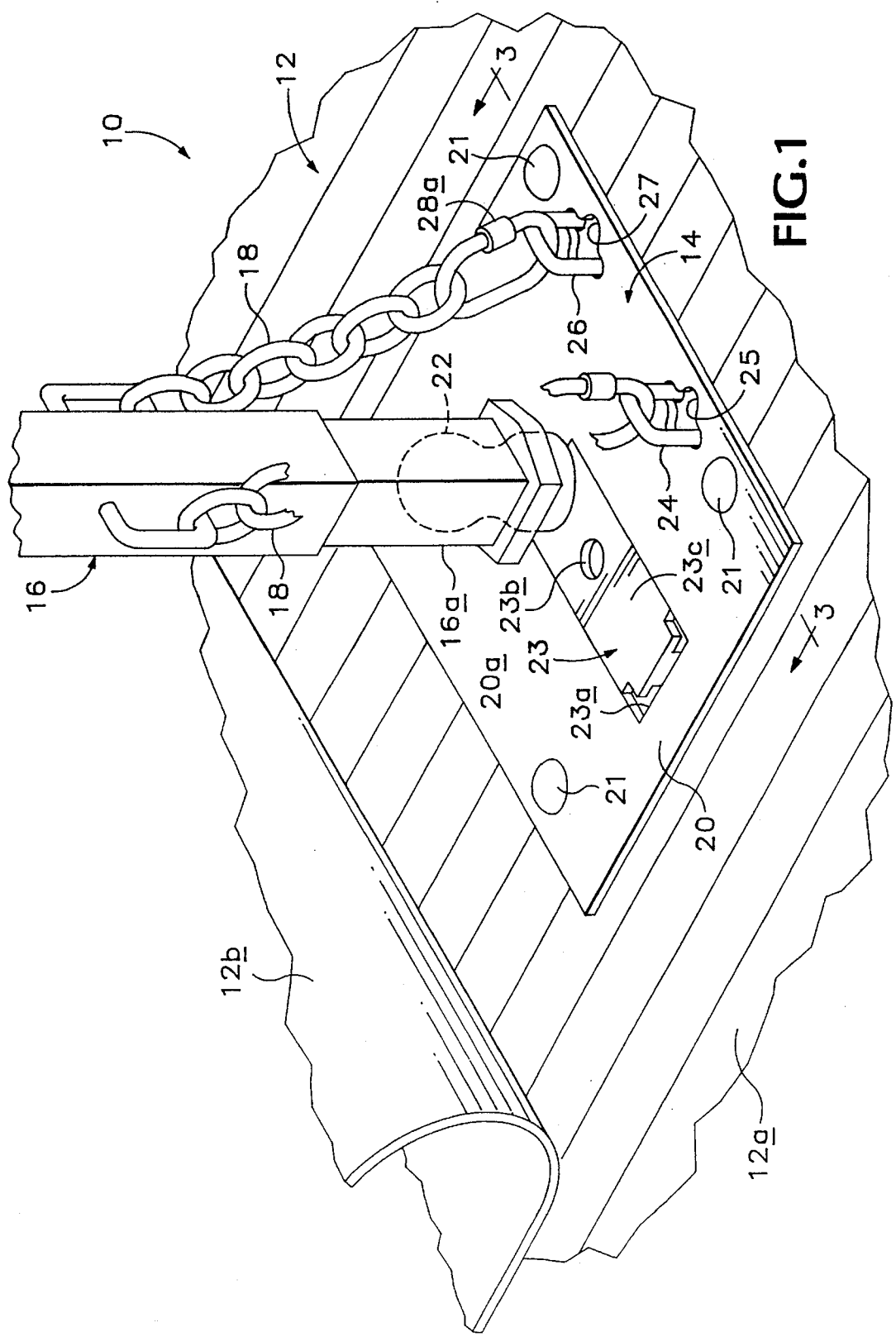
FIG. 1 is an isometric view of a hitch assembly constructed in accordance with a preferred embodiment of the invention, such hitch assembly being mounted in the bed of a truck and carrying a trailer with a pair of safety chains.

DETAILED DESCRIPTION OF THE PREFERRED EMBODIMENT AND BEST MODE OF CARRYING OUT THE INVENTION

Referring initially to FIG. 1, it will be understood that a fragment of a conventional towing vehicle 10 has been shown, such vehicle providing a setting for the hitch invention which is herein described.

As indicated, vehicle 10 takes the form of a conventional pick-up truck, having a bed 12 in which a fifth wheel hitch assembly 14 mounts. The truck's bed typically defines a generally planar vehicle body surface 12a which may be covered by a removable mat such as that shown at 12b. Hitch assembly 14 is constructed in accordance with a preferred embodiment of the present invention, being adapted for coupling with a trailer 16 and a pair of associated safety chains 18.

Focussing attention now on fifth wheel hitch assembly 14, it will be noted that such assembly includes a base plate 20 having a generally planar upper support surface 20a. The base plate is secured to the bed of the towing vehicle, generally being mounted centrally over a hole, or opening, through which the hitch assembly's underbody may be received (FIG. 3). Fasteners, such as those shown at 21, secure the hitch assembly in place.

The base plate is relatively thin, generally being less the ¼-inch thick, and is contoured substantially similar to the contour of vehicle body surface 12a. Upper support surface 20a thus will be understood to lie generally flush with the vehicle body surface 12a so as to minimize any interference with the vehicle's use. This is particularly important where the hitch assembly is mounted in a truck bed where a generally flat surface is desired. It will be appreciated, however, that the support surface may be shaped variously in accordance with the contour of the body surface on which the hitch assembly mounts.

When configured as shown in FIG. 1, hitch assembly 14 will be seen to include a hitch mount which extends upwardly from the base plate in the form of a common hitch ball 22. As shown, the hitch ball is configured to couple with a matching trailer mount in the form of a trailer tow bar 16a which extends over the hitch ball and locks in place using a conventional locking mechanism (not shown). Hitch ball 22 thus acts as a primary coupling between the towing vehicle and the trailer which is towed thereby.

In accordance with the present invention, the hitch ball is retractable, the base plate being provided with a pivotal trap door 23 which may be pivoted to uncover a hitch mount recess 23a. The trap door 23 defines a finger opening 23b which provides for gripping by a hitch operator to readily open and close the trap door. Once the hitch mount recess is uncovered, the hitch ball may be pivoted, or otherwise retracted, into the hitch mount recess, and the trap door closed so as to cover the hitch ball. This operation is best illustrated in FIG. 3, where the hitch ball is shown pivoting about an axis defined by pivot pin 22a.

The retracted hitch ball lies within a housing 22b, which is below the level of base plate support surface 20a, and is covered by the closed trap door 23. When closed, the trap door's upper surface 23c lies generally flush with the base plate support surface. FIG. 2 shows the hitch assembly with the hitch ball retracted and the trap door closed.

In the depicted embodiment, trap door 23 serves a dual purpose, serving both as a cover for a retracted hitch ball (FIG. 2), and as a locking mechanism whereby the hitch ball is held in its upright orientation when the hitch ball is extended and the trap door is closed (FIG. 1). It will be noted, for example, that the base plate and trap door collectively define a circular opening 22c (FIG. 2) when the trap door is closed. Such circular opening closely conforms to the size and shape of the foundation of the hitch mount.

A secondary coupling is provided by a safety chain connector arrangement in the form of a pair of safety chain connectors 24, 26 which are coupled with the hitch base plate via a keeper arrangement 30. The safety chain connectors provide seats for safety chains 18. The safety chain connectors also preferably are arranged symmetrically about the hitch ball (on the portion of the hitch base plate which is toward the rear of the towing vehicle) so as to provide a somewhat stable secondary coupling between trailer 16 and towing vehicle 10.

As indicated, the safety chain connectors extend upwardly from the base plate when in use (FIG. 1), but retract into base plate recesses when the hitch assembly is not in use (FIGS. 2 and 3). Connector 24 thus will be seen to retract into safety chain recess 25. Connector 26 retracts into a similar safety chain recess 27. Each safety chain recess is defined by a pair of transversely-intersecting elongate slot portions 25a, 25b, 27a, 27b which allow for ready grasping of the retracted safety chain connectors to pull them out from safety chain recesses 25, 27.

In FIGS. 1 through 3, each connector takes the form of a loop segment which defines an eyelet through which a safety chain may be connected to the hitch base plate. Such connection is made via a removable safety chain link 28 which includes an opening selectively closed by a threaded sleeve 28a or other means such as a locking hook, clip latch, etc. To remove the safety chain, the hitch operator need only turn sleeve 28a so as to expose an opening in link 28 and then slide the link over safety chain connector 26. Similarly, link 28 may be removed from the safety chain by passing the safety chain through the opening in link 28.

Keeper arrangement 30 includes a pair of transverse keeper bars 30a, 30b, each of which extends within a safety chain recess to keep a corresponding safety chain connector in coupled relation with the hitch base plate. The safety chain connectors, it will be noted, are configured for limited movement relative to the keeper bars, each including a pair of stops 24a, 26a. As should be apparent from the dashed line illustration of the right side safety chain connector identified as 26' in FIG. 3, removal of the safety chain connector will be prohibited by contact between stops 26a' and keeper bar 30b.

The safety chain connectors and hitch mount collectively may be considered to be a trailer coupling arrangement. The safety chain recesses and hitch mount recesses collectively may be considered a trailer coupling recess arrangement. It will be appreciated that the trailer coupling arrangement and trailer coupling recess arrangement both may vary without departing from the invention as claimed.

As indicated in FIGS. 2 and 3, the safety chain connectors and the hitch mount all retract into corresponding recesses to provide a hitch assembly which lies generally flush with the surface of truck bed 12a. It thus will be appreciated that bed mat 12b (FIG. 1) may be placed over the hitch assembly, making the hitch assembly virtually undetectable to the towing vehicle's operator when the hitch assembly is not in use.

In another embodiment of the invention, shown in FIG. 4, a hitch assembly 114 is provided with an alternative safety chain connector arrangement in the form of a pair of pivotal flaps 124, 126. Hitch assembly 114 mounts in a truck bed 112 on a generally planar vehicle body surface 112a, and is configured for use in coupling the truck to a trailer such as that indicated at 16 in FIG. 1. Trailer 16, it will be recalled employs a pair of trailer-connected safety chains such as that shown at 18.

Like hitch assembly 14, hitch assembly 114 includes a thin base plate 120 with a generally planar upper support surface 120a. The base plate is secured to the towing vehicle over a hole, or opening, securement being accomplished via fasteners such as those shown at 121. A hitch mount in the form of a common hitch ball 122 extends upwardly from the base plate to couple with a matching trailer mount. The hitch ball is retractable through a trap door 123 which lies generally flush with the base plate's upper support surface when closed to cover hitch mount recess 123a.

Unlike the hitch assembly shown in FIGS. 1 through 3, however, the hitch assembly of FIGS. 4 through 6 includes the safety chain connector arrangement in the form of a pair of flaps 124, 126, each of which is pivotally retractable into a corresponding safety chain recess 125, 127. Each safety chain recess is shaped similarly to its corresponding flap. Although the depicted flaps are rectangular, it will be understood that such flaps may take a variety of other shapes. The flaps and safety chain recesses are arranged symmetrically about the hitch mount. Each of the safety chain connector flaps defines an eyelet 124a, 126a, such eyelets being configured to receive a removable safety chain link such as that shown at 128. The removable safety chain links, in turn, connect to the safety chains.

Referring now to FIGS. 5 and 6, where flap 124 is shown in detail, it will be noted that such flap is mounted in a socket 130 for pivot between a retracted orientation (FIG. 5) and an extended orientation (FIG. 6) about an axis defined by pin 124b. Such pivot is illustrated by arrow 131 in FIG. 6. In the retracted orientation, the flap rests against ledge defined by a stop 132. In the extended orientation, the flap rests against the recess wall. The flap defines a support surface 124c which, when closed, lies generally flush with upper support surface 120a.

The safety chain connectors and hitch mount (collectively, the trailer coupling) of the hitch assembly shown in FIGS. 4 through 6 therefore will be understood to retract into a corresponding recesses (collectively, the trailer coupling recess arrangement) to provide a hitch assembly which lies generally flush with the towing vehicle's body surface. Hitch assembly 114 thus is configurable to lie generally flush with the towing vehicle body surface so as to minimize interference with towing vehicle appearance and utility when the hitch assembly is not in use.

While the present invention has been shown and described with reference to the foregoing operational principles and preferred embodiment, it will be apparent to those skilled in the art that other changes in form and detail may be made therein without departing from the spirit and scope of the invention as defined in the appended claims.

I claim:

1. A hitch assembly for use in coupling the towing vehicle with a trailer, said hitch assembly comprising:

a hitch base plate configured for attachment to the towing vehicle, said hitch base plate including a support surface contoured substantially similar to a body contour of the towing vehicle, and said hitch base plate defining a safety chain recess, said safety chain recess being configured to house said safety chain connector, and wherein said safety chain recess includes a pair of transversely intersecting elongate slot portions;

a hitch mount configured for retractable extension from said hitch base plate to provide a seat for a matching trailer mount;

a safety chain connector configured for retractable extension from said hitch base plate to selectively provide a seat for a trailer-connected safety chain, said safety chain connector being defined by a retractable flap with an eyelet, said hitch base plate including a safety chain recess configured to house said flap;

wherein said hitch base plate includes a keeper which extends across said safety chain recess to couple said flap with said hitch base plate;

wherein said hitch assembly further includes a removable safety chain link which connects the safety chain to said flap; and said hitch mount and said safety chain connector being retractable to provide a hitch assembly which conforms generally to the body contour of the towing vehicle when said hitch assembly is not in use.

2. The hitch assembly of claim 1, wherein said flap is pivotally mounted on said hitch base plate, said safety chain recess being configured to receive said flap to provide a hitch base plate with a support surface which conforms substantially to the body contour of the towing vehicle.

3. A fifth wheel hitch assembly which secures to a generally planar body surface of a towing vehicle for use in coupling the towing vehicle with a trailer which is to be towed, said hitch assembly comprising:

a thin, generally planar base plate attached to the body surface of the towing vehicle, said base plate including an upper support surface which defines a trailer coupling recess arrangement;

a pivotal hitch mount which extends selectively from said base plate to provide a seat for a matching trailer mount, said hitch mount being retractable into said trailer coupling recess arrangement; and a plurality of safety chain eyelets which extend selectively from said base plate to provide seats for trailer-connected safety chains, each safety chain eyelet being retractable into said trailer coupling recess arrangement, and wherein each safety chain eyelet is defined in a retractable flap which extends and retracts through said trailer coupling recess arrangement, said base plate including a keeper within said trailer coupling recess arrangement to couple said eyelet with said base plate; and said hitch assembly thus being adaptable to lie generally flush with the body surface of the towing vehicle when said hitch assembly is not in use.

4. The hitch assembly of claim 3, wherein each flap is pivotally mounted on said base plate.

5. In a fifth wheel hitch assembly having a thin, generally planar base plate installed on a generally planar body surface of a towing vehicle, and a retractable hitch mount which extends selectively from said base plate to provide a seat for a matching trailer mount of a trailer which is to be towed, the improvement comprising:

a retractable safety chain connector which extends selectively from said base plate to provide a seat for a trailer-connected safety chain, said safety chain connector and hitch mount retracting to provide a hitch assembly which lies generally flush with the body surface of the towing vehicle; and wherein said base plate includes a safety chain recess configured to house said safety chain connector to provide a base plate with a generally planar support surface, and a transverse keeper which extends across said safety chain recess, said safety chain connector being defined by a pivotally retractable flap with an eyelet, which flap extends and retracts through said safety chain recess and is coupled to the base plate via said keeper.

\* \* \* \* \*